United States Patent [19]

Tokushima

[11] Patent Number: 4,463,649

[45] Date of Patent: Aug. 7, 1984

[54] WAVEFORM PRODUCING SYSTEM EMPLOYING SCANNING OF A WAVEFORM PATTERN

[75] Inventor: Tadao Tokushima, Hamamatsu, Japan

[73] Assignee: Nippon Gakki Seizo Kabushiki Kaisha, Shizuoka, Japan

[21] Appl. No.: 584,339

[22] Filed: Jun. 6, 1975

Related U.S. Application Data

[63] Continuation of Ser. No. 415,494, Nov. 14, 1973, abandoned.

[30] Foreign Application Priority Data

| | | | |
|---|---|---|---|
| Nov. 17, 1972 | [JP] | Japan | 47-114820 |
| Nov. 27, 1972 | [JP] | Japan | 47-117976 |
| Nov. 27, 1972 | [JP] | Japan | 47-117979 |
| Nov. 27, 1972 | [JP] | Japan | 47-117980 |
| Nov. 27, 1972 | [JP] | Japan | 47-117981 |

[51] Int. Cl.[3] .......... G01H 3/06; G01H 3/08

[52] U.S. Cl. .......... 84/1.18; 84/1.28; 250/338; 250/566; 250/569

[58] Field of Search .......... 84/1.01-1.03, 84/1.14, 1.15, 1.18, 1.23, 1.28, DIG. 29; 340/172.5, 174 AG, 174 EB, 174 HA, 174 YC; 250/566, 568, 569, 578, 330, 332, 334, 338, 341; 356/51

[56] References Cited

U.S. PATENT DOCUMENTS

| | | | |
|---|---|---|---|
| 3,231,875 | 1/1966 | Ishidate | 340/174 AG |
| 3,257,493 | 6/1966 | Hurvitz | 84/1.02 |
| 3,305,669 | 2/1967 | Fan | 250/568 X |
| 3,394,262 | 7/1968 | Kintigh | 250/568 |
| 3,403,262 | 9/1968 | Seidel | 250/568 |
| 3,414,891 | 12/1968 | Kohn | 340/174 AG |
| 3,521,255 | 7/1970 | Arndt | 340/174 HA |
| 3,629,835 | 12/1971 | Brown et al. | 250/569 X |
| 3,720,929 | 3/1973 | Jones | 340/174 YC X |
| 3,760,357 | 9/1973 | Inose et al. | 340/74 YC X |
| 3,769,515 | 10/1973 | Clark, Jr. | 250/341 |
| 3,828,643 | 8/1974 | Morez | 84/1.01 X |

*Primary Examiner*—S. J. Witkowski

*Attorney, Agent, or Firm*—Robert E. Burns; Emmanuel J. Lobato; Bruce L. Adams

[57] ABSTRACT

A waveform producing system in which a source of infrared radiation or magnetic flux in a pattern forming section applies energy to a mask constituting a pattern-forming device that passes and masks the radiation or flux for passing the radiation or flux in a pattern which represents a waveform in a coordinate system with axes of time and amplitude in a plane. This distributes the radiation or flux and amplitude in a plane, and distributes the radiation or flux spatially in a pattern corresponding to the waveform. A matrix of transducers in series within parallel rows in a conversion section receive the radiation or flux passed and converts it to electrical signals which have a sampled value of the waveform. The sampled values thus obtained are scanned subsequentially in the direction of the time axis by a sequential readout circuit and the outputs of the sampled values are arranged sequentially with time to develop the waveform.

16 Claims, 13 Drawing Figures

WAVEFORM PRODUCING SYSTEM EMPLOYING SCANNING OF A WAVEFORM PATTERN

This is a continuation of application Ser. No. 415,494, filed Nov. 14, 1973, and now abandoned.

BACKGROUND OF THE INVENTION

This invention relates to a waveform producing system and more particularly to a system which stores and produces waveforms such as tone-coloring signals or envelope signals in electronic musical instruments.

In such an electronic musical instrument, various musical tones are produced by modulating signals from tone generators with tone-coloring waveforms or envelope waveforms. In this operation, it is essential that these waveforms are predetermined by appropriate means.

SUMMARY OF THE INVENTION

A first object of this invention is to provide a waveform producing system in which a waveform or waveforms predetermined are readily stored and produced.

A second object of the invention is to provide a waveform producing system in which a waveform to be produced can be readily exchanged with other ones.

A third object of the invention is to provide a waveform producing system whose maintenance is hardly necessary because of the employment of component parts having a semi-permanent service life.

A fourth object of the invention is to provide a waveform producing system which is compact and simple in construction.

The foregoing objects and other objects of this invention have been achieved by the provision of a waveform producing system which comprises a thermal pattern forming section provided with an infrared ray generating source and infrared ray shielding plate adapted to shield a part of the infrared rays to form a thermal pattern corresponding to a waveform to be produced, a thermal-energy-to-electric-energy conversion section for converting the thermal pattern into electrical outputs which represent time-sequentially sampled amplitudes of the waveform to be produced, the electrical outputs being sequentially read out by a sequential read circuit.

Furthermore, these objects have been achieved by the provision of a waveform producing system which comprises a magnetic pattern forming section for forming a magnetic pattern corresponding to a waveform to be produced, and a magnetic-energy to electric-energy converting section for converting the magnetic pattern into electric outputs which represent time-sequentially sampled amplitudes of the waveform to be produced, the electrical outputs being sequentially read out by a sequential read circuit.

This invention will be better understood from the following detailed description and the appended claims when read in conjunction with the accompanying drawings in which like parts are designated by like reference numerals or characters.

DETAILED DESCRIPTION OF THE INVENTION

This invention will be described in connection with the case where it is applied for the production of a waveform such as a tone-coloring waveform signal and an envelope waveform signal of electronic musical instruments.

Figure 1:
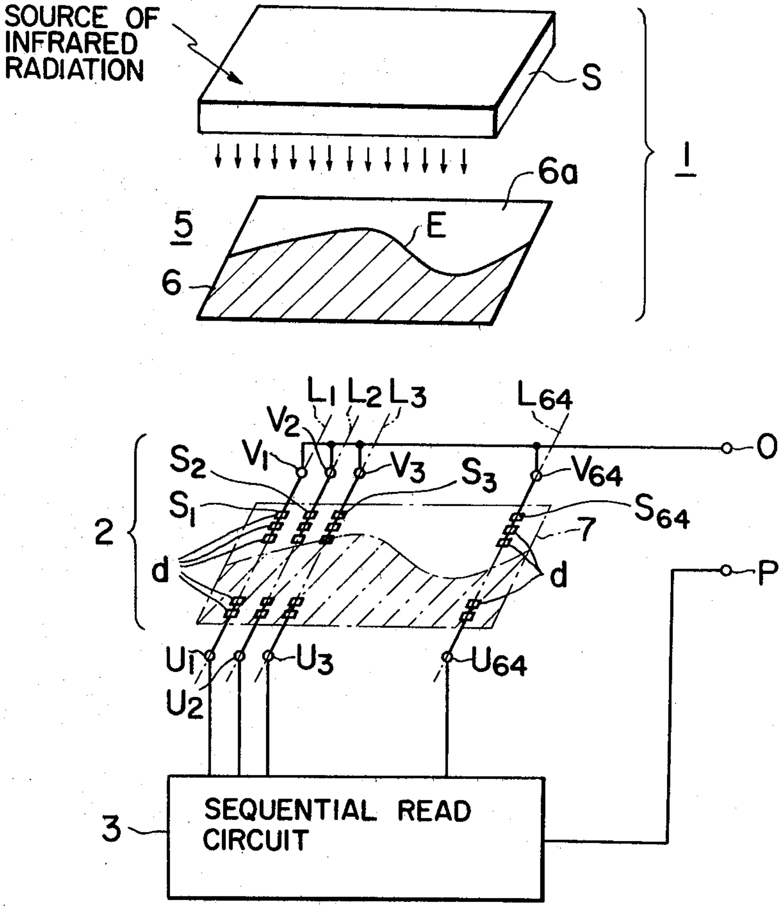
FIG. 1 is an explanatory diagram illustrating a first example of a waveform producing system according to this invention.

With reference to FIG. 1, there is shown a first example of a waveform producing system according to this invention. In this first example, a specific characteristic of ferromagnetic material that is shows Hopkinson effect is utilized.

The first waveform producing system comprises a thermal pattern forming section 1 for forming a thermal pattern corresponding to a waveform to be produced, a conversion section 2 for converting thermal energy into electrical energy, that is, the thermal pattern into electrical outputs in this case (hereinafter referred to as a thermal-to-electric conversion section 2 when applicable), and a sequential read circuit to sequentially read out the electrical outputs.

The thermal pattern forming section 1 is provided with an infrared radiation generating source S and an infrared ray shielding plate 5 disposed on the path of infrared radiation from the infrared radiation generating source S, as is shown in FIG. 1. The infrared ray shielding plate 5 has an infrared ray absorbing region 6 which is made of, for instance, a black paper. An edge line E of the infrared ray absorbing region 6 is so formed as to provide a thermal pattern which is substantially equal to or similar to the waveform to be produced more specifically, the edge line E divides the shielding plate 5 into two regions: the infrared ray absorbing region 6 and an infrared ray passing region *6a.* Passing through the region *6a,* infrared rays form the thermal pattern.

The conversion section 2 comprises a number of transducers which convert thermal energy developed by received infrared radiation to electric energy (hereinafter referred to as thermal-to-electric transducers d when applicable), the transducers d forming for instance sixty-four parallel lines $L_1$ through $L_{64}$ disposed in a plane 7, as shown in FIG. 1. Each of the transducer lines $L_1$ through $L_{64}$ is provided with for instance 128 transducers d.

Figure 2:
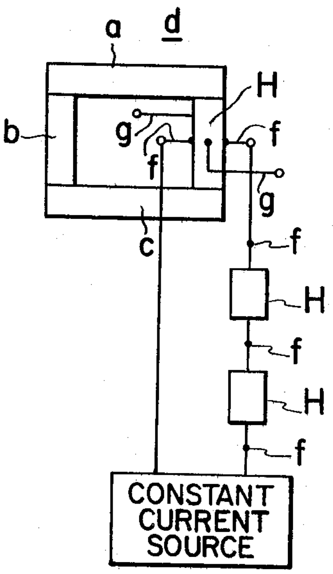
FIG. 2 is a side view illustrating a transducer employed in the first example shown in FIG. 1.
Figure 3:
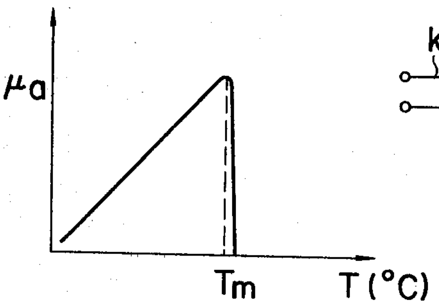
FIG. 3 is a graphical representation indicating a characteristic curve of a heat receiving piece included in the transducer shown in FIG. 2.

Each of the transducers d as is shown in FIG. 2 has a heat or energy receiving piece a which is heated, and which is made of ferromagnetic material, such as ferrite Mn-Zn.$Fe_2O_3$ which has a relatively low Currie point. The heat receiving piece a receives the thermal pattern from the thermal pattern forming section 1. With a heat or energy receiving piece a made of ferrite, having a temperature dependent magnetic permeability $\mu a$, the permeability reaches a peak value at a peak temperature Tm which is lower than the Currie point but close thereto, as is shown in FIG. 3. More specifically until the temperature of heat developed by the heat receiving piece a increases to the peak temperature Tm the permeability progressively increases with the temperature of heat received thereby, but when the temperature of heat exceeds the peak temperature Tm the permeability abrubtly decrease, as is shown in FIG. 3. In general, the peak temperature Tm is in the range of from about 30 to 60 degrees Celsius.

The heat receiving piece a forms a magnetic circuit with the above-described transducer d, a magnetic flux generating source, that is, a ferrite magnet b a permalloy piece c and a Hall element H which is a transducer for converting magnetic energy into electric energy. Magnetic flux induced by the ferrite magnet b flows in the magnetic circuit, that is, it flows from one and of the magnet b through the permalloy piece c, the Hall element H and the heat receiving piece a to the other end of the magnet b.

In each of the transducer lines $L_1$ through $L_{64}$ current lines f of 128 Hall elements H are connected electrically in series to one another. Furthermore, the current lines of the Hall elements H positioned at both ends of the transducer lines $L_1$ through $L_{64}$ are connected in series to one another and the current lines thus connected are connected to a constant current source. On the other hand, in each of the transducer lines $L_1$ through $L_{64}$ output lines g of the Hall elements are successively connected in series to one another. Free output lines of the Hall elements H disposed at one end of the transducer lines $L_1$ through $L_{64}$ are connected to output terminals $U_1$ through $U_{64}$, respectively, while free output lines of the Hall element disposed at the other ends are connected to output terminals $V_1$ through $V_{64}$, respectively.

The conversion section 2 is positioned under the thermal pattern forming section 1 by means of a supporting device (not shown) so as to confront the infrared ray shielding plate 5. Then, the thermal pattern formed by infrared rays is applied to the heat receiving pieces a of the transducers d which are covered by the region other than the infrared ray absorbing region 6, or the infrared ray passing region *6a* of the shielding plate 5. In this operation, if the temperature distribution of the thermal pattern has been predetermined so that the temperatures of the heat receiving pieces applied with the thermal pattern formed by infrared rays become greater than the peak temperature Tm (for instance 55° C.), while the temperatures of the other heat receiving pieces, that is, the heat receiving pieces other than applied with the thermal pattern become lower than the peak temperature Tm, the permeability $\mu_o$ of the former heat receiving pieces becomes extremely low when compared with the latter. That is the magnetic loop of the transducer d applied with the thermal pattern is opened by the heat receiving piece a. More specifically the magnetic fluxes in the magnetic circuits of the transducers d applied with the thermal pattern are reduced or eliminated, as a result of which their Hall elements H produce no output voltage. On the other hand, the Hall elements H of the transducers d which are not applied with the thermal pattern produce output voltages corresponding to the permeability $\mu_o$ of their heat receiving pieces a. In each transducer line, these output voltages are added thereby to produce a total output voltage across the output terminals. That is, the total output voltage is correspondent to the number of the transducers d which have been applied with the thermal pattern. Such total output voltages are obtained between the output terminals $U_1$ and $V_1$, through $U_{64}$ and $V_{64}$ of the element lines $S_1$ through $S_{64}$, respectively.

Since the total output voltages thus obtained are correspondent to the numbers of the transducers which are not applied with the thermal pattern as was described above, it follows that the total output voltages represent time-sequentially sampled amplitudes of the thermal pattern formed by the shielding plate 5 and accordingly those of the waveform to be produced.

The output terminals $V_1$ through $V_{64}$ of the transducer lines $L_1$ through $L_{64}$ are connected to a common waveform, output terminal O, while the other output terminals $U_1$ through $U_{64}$ are connected in order to input terminals of the sequential read circuit 3.

The sequential read circuit 3 operates to read out the total output voltages at the output terminals $U_1$ through $U_{64}$ of the conversion section 2 in the order described at predetermined time intervals for the purpose of reading out the waveform to be produced. A conventional sequential read circuit can be employed as the sequential read circuit 3.

The combination of the thermal pattern and the conversion section 2 allows a waveform of, for instance, a tone coloring signal to be stored. Then, by sequentially reading the total output voltages of the transducer lines by the sequential read circuit 3, the thermal pattern formed by the shielding plate 5, that is, the waveform to be produced is sequentially produced in a mode of sampling amplitudes thereof.

This, in the waveform producing system according to this invention, storing and reading a waveform to be produced is attained by the utilization of a magnetic material having Hopkinson effect. Furthermore, in this system, a relatively intricate waveform can be readily stored, as desired, merely by forming the infrared ray absorbing region 6 equal or similar in a pattern to the waveform on the shielding plate 5 without any other troublesome work or any other thing, and if it is necessary to change the waveform to be produced, it can be readily achieved only by exchanging the shielding plate 5 with other ones without changing any other components. This feature of the invention sufficiently satisfies the requirement of a device, such as an electronic musical instrument, in which a waveform to be produced is to be changed as required.

Figure 4:
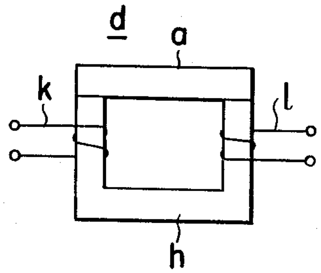
FIG. 4 is a side view of a modification of the transducer shown in FIG. 2.

Shown in FIG. 4 is one modification of the transducer d shown in FIG. 2. In this modification, a U-shaped magnetic core h is provided to form a magnetic circuit with the heat receiving piece a described before. A primary winding k (connected to a constant current source is provided as a magnetic flux generating source on one arm of the magnetic core h, while a secondary winding l is provided on the other arm of the core k in order to convert magnetic flux into an electrical output, as is shown in FIG. 4. The transducer d thus organized has the same effect as that shown in FIG. 2.

While the first example of this invention has been described in connection with the case where the edge line E of the infrared ray absorbing region 6 which is formed on the shielding plate 5 forms the thermal pattern equal to or similar to the waveform to be produced, the invention is not limited thereby or thereto. All that is necessary for the thermal pattern forming section 1 is to render the lateral lengths, or amplitudes, of the infrared ray absorbing region 6 or the infrared passing region 6*a* correspondent to the time-sequentially sampled amplitudes of the waveform to be produced. It goes without saying that the infrared ray shielding plate can form other thermal patterns.

In the waveform producing system described above, the thermal pattern forming section 1 is constituted by the infrared ray generating device and the infrared ray shielding plate 5 to form the thermal pattern. However, the formation of the thermal pattern may be attained directly by an infrared ray generating device which has a planar temperature distribution corresponding to the waveform to be produced.

Furthermore, the formation of the thermal pattern by infrared ray can be replaced by a method in which the thermal pattern is applied to the conversion section 2 with the aid of thermal conduction, that is, a method for instance in which a thermal conductor having a pattern corresponding to the waveform is rendered to contact the surface of the conversion section 2.

Figure 5:
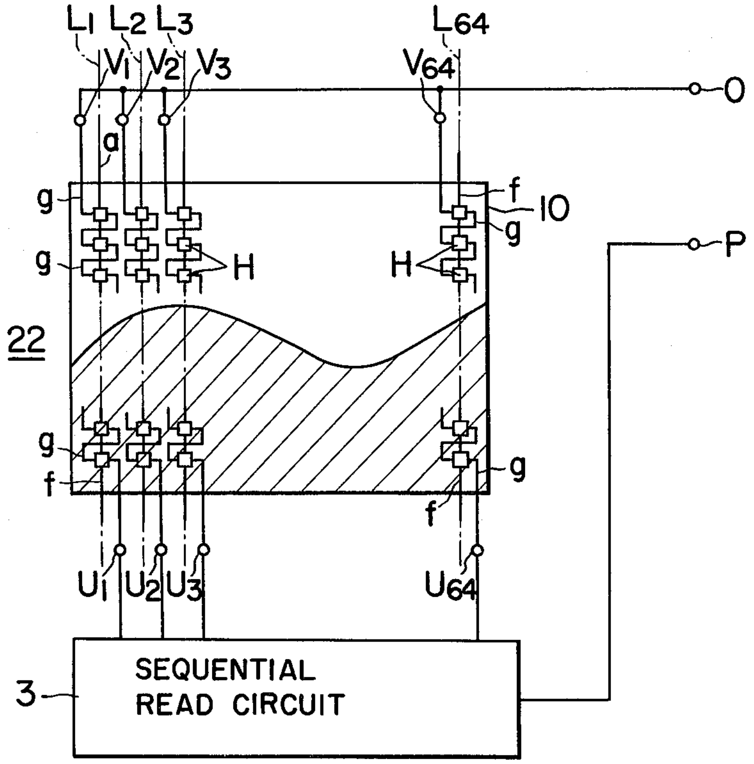
FIG. 5 is an explanatory diagram illustrating a second example of the waveform producing system of this invention.
Figure 6:
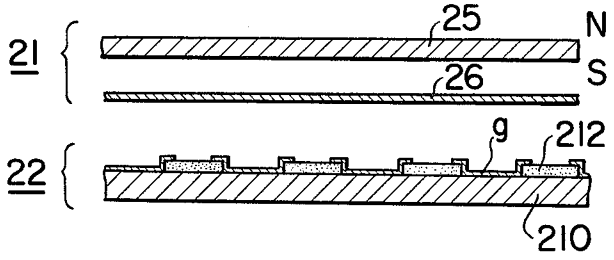
FIG. 6 is a sectional view illustrating a magnetic pattern forming section and a magnetic-energy-to-electric-energy converting section of the second example.
Figure 7:
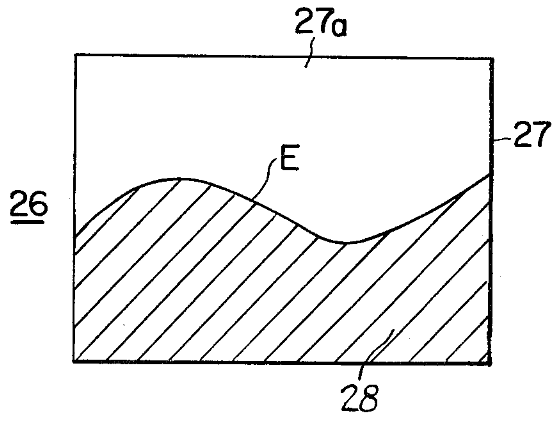
FIG. 7 is a plan view illustrating a magnetic shield plate included in the magnetic waveform forming section shown in FIG. 6.

A second example of the waveform producing system according to this invention is illustrated in FIGS. 5, 6 and 7 which comprises a magnetic pattern forming section 21 for producing a magnetic pattern corresponding to a waveform to be produced, a conversion section 22 for converting magnetic energy into electric energy, that is, the magnetic pattern into electrical output in this case (hereinafter referred to as a magnetic-to-electric conversion section when applicable), and the sequential read circuit 3 described in connection with the first example of this invention.

The magnetic pattern forming section 21 is provided with a ferrite magnet plate 25 magnetized in the direction of its thickness and a card-like or sheet-like magnetic shield plate 26 placed under the ferrite magnet plate 25, as is shown in FIG. 6. The magnetic shield plate 26 is constituted by a card or sheet 27 made of "Mylar" and a magnetic shield layer 28 made of a magnetic material such as permalloy which is secured over a part of the sheet 27 as shown in FIG. 7. Similarly as in the first example of this invention, an edge line E of the shield layer 28 is so formed as to provide a magnetic pattern which is substantially equal to or similar to the waveform to be produced. Accordingly, a part of the magnetic field generated from the magnetic plate 25 is shielded by the shield layer 28, while the other part of the magnetic field passes the plate 26 thereby forming the magnetic pattern.

The conversion section 22, as is shown in FIGS. 5 and 6, comprises a substrate 210 made of, for instance, a ferrite plate whose thickness is in the order of 5 or 6 mm. or a permalloy plate whose thickness is in the order of 2 mm, and Hall elements forming for instance sixty-four parallel lines $L_1$ through $L_{64}$, these Hall element lines are arranged on the substrate 210 as shown in FIG. 5. Each of the Hall element lines $L_1$ through $L_{64}$ is provided with for instance 128 Hall elements.

The connections of the current lines f and output lines g of the Hall elements are made in the same manner as in the first example of this invention, as is apparent from FIG. 5.

The Hall element lines $L_1$ through $L_{64}$ are formed by vacuum-evaporating Hall element layers 212 of indium antimonide InSb at predetermined intervals on the substrate 210 of Mn-Zn $Fe_2O_3$ and by vacuum-evaporating the current lines f and output lines g made of Al, Cu or Pt between the Hall element layers 212.

The magnetic-to-electric conversion section 22 is positioned under the magnetic pattern forming section 21 by means of a supporting device (not shown) so as to confront the magnetic shield plate 26.

Magnetic flux from the ferrite magnet plate 25 are therefore applied through a region 27*a* of the plate 26 which is not covered by the magnetic shield layer 28 (which region being referred to as a flux passing region 27*a* hereinafter when applicable) to the Hall elements which are directly under the flux passing region 27*a*, that is, the magnetic pattern is applied to the Hall elements covered by the flux passing region 27*a*. In this operation, if the magnetic flux distribution of the magnetic pattern is uniform, the Hall elements applied with the magnetic pattern produce substantially the same output voltage. In each Hall element line, these output voltages are added thereby to produce a total output voltage which is correspondent to the number of the Hall elements applied with the magnetic pattern. Such total output voltages are produced across the output terminals $U_1$ and $V_1$, $U_2$ and $V_2$ - - - $U_{64}$ and $V_{64}$ of the Hall element lines $L_1$ through $L_{64}$. For instance, if in the Hall element line $L_3$ three Hall elements are covered by the magnetic pattern, its total output voltage is correspondent to three, or the sum of output voltages induced by the three Hall elements is produced across the output terminals $U_3$ and $V_3$.

The total output voltages at the output terminals $U_1$ through $U_{64}$ are sequentially read out by the sequential read circuit 3 to its waveform output terminal P in the same manner as in the first example of this invention. In this case also, a conventional waveform read circuit can be employed as the waveform read circuit 3.

The combination of the magnetic pattern formed by the magnetic pattern forming section 21, the conversion section 22 allows a waveform of, for instance, a tone coloring signal to be stored, reading out the total output voltages of the Hall element lines by the sequential read circuit, the pattern formed on the magnetic shield plate 26, that is, the waveform to be produced is sequentially produced in a mode of sampling amplitude thereof.

As is apparent from the above descriptions, according to the second example of the invention, the magnetic pattern forming section 21 and the magnetic-to-electric conversion section 2*a* can be assembled relatively thin in thickness. Therefore, in the case where various waveforms are selectively read out, even if the number of the waveforms, or the assemblies, is considerably great, the space for accomodating the assemblies can be relatively small, and the electrical connection of the assemblies can be readily achieved. The component parts of this assembly are not consumables, or their service lives are semi-permanent. Accordingly, the maintenance of the assemblies is hardly necessary.

Similarly as in the first example of this invention, the waveform to be produced can be stored merely by forming the shield layer 28 substantially equal to or similar to the waveform without any other troublesome work or any other thing, and accordingly relatively intricate waveforms can be readily stored and produced and such waveforms can be changed only by exchanging the magnetic shield plate 26. This sufficiently meets the requirement of a device, such as an electronic musical instrument, in which a waveform to be produced is to be changed as required.

While the second example of this invention has been described in connection with the case where the edge line E of the shield layer 28 formed on the magnetic shield plate 26 forms the pattern substantially equal to or similar to the waveform to be produced similarly as in the first example of this invention, the invention is not limited thereto or thereby. All that is necessary for the magnetic pattern forming section 21 is to render the lateral lengths, or amplitudes, of the shield layer 28 or the flux passing region 27*a* corresponding to the time-sequentially sampled amplitudes of the waveform to be produced. This invention is not limited to the production of a waveform such as shown in FIG. 7 and can apply to the production of other waveforms.

In the second waveform producing system described above, the magnetic pattern forming section is formed by piling the magnet plate 25 on the magnetic shield plate 26 to form the magnetic pattern. However, the formation of the magnetic pattern may be attained by a magnet plate or a magnetic card which itself has a pattern magnetized corresponding to the waveform to be produced. In this case, the thickness of the magnetic pattern forming section 21 can be made much thinner.

Figure 8:
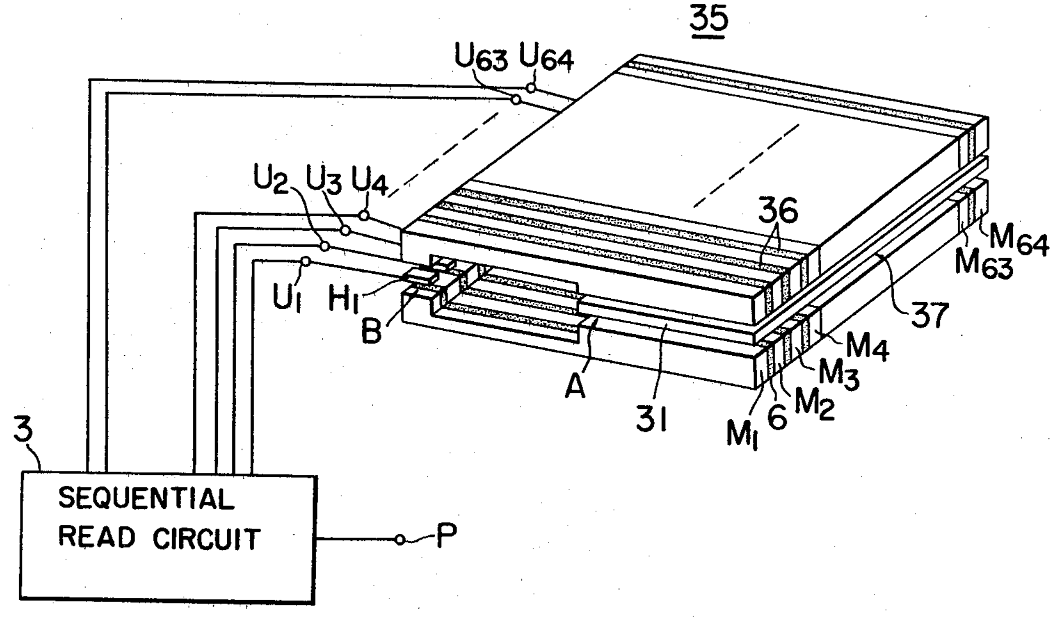
FIG. 8 is an explanatory diagram, partly as a perspective view and as a block diagram, illustrating a third example of the waveform producing system according to this invention.

A third example of the waveform producing system according to this invention is illustrated in FIG. 8 which comprises a magnetic pattern forming section comprising a magnetic cord 31, a magnetic-to-electric conversion section provided with a magnetic head 35 and Hall elements, and the conventional sequential read circuit 3 described previously.

Figure 9:
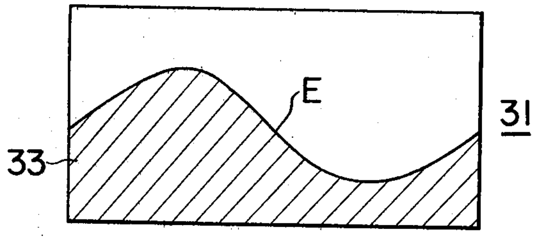
FIG. 9 is a plan view of a magnetic card employed in the third example.

The magnetic card 31 has a magnetized region 33 which is attained by uniformly magnetizing, a part of the magnetic card as is shown in FIG. 9. A magnetic sheet or a magnetic tape can be used instead of the magnetic card. An edge line E of the magnetized region is so formed as to produce a magnetic pattern which is substantially equal to or similar to a waveform to be produced.

The magnetic head 35 is constituted by for instance sixty-four magnetic head segments $M_1$ through $M_{64}$. These magnetic head segments have substantially the same shape, laterally short, or thin, and horizontally long for instance, and are made of a magnetic material such as permalloy. The magnetic head segments $M_1$ through $M_{64}$ have first air gaps A in their one end portions, and second air gaps B in their other end portions, respectively. The air gap A is much greater in horizontal length than the air gap B. The magnetic head segments $M_1$ through $M_{64}$ are arranged in such a manner that they are magnetically shielded by inserting magnetic shield plates 36 of, for instance, copper between adjacent magnetic head segments as is shown in FIG. 8. The first air gaps A forms the air gap 37 for accomodating the magnetic card 31.

On the other hand, there are provided Hall elements $H_1$ through $H_{64}$ in the second air gaps B of the magnetic head segments $M_1$ through $M_{64}$, respectively. The current lines (not shown) of the Hall elements $H_1$ through $H_{64}$ are connected in series to one another and to a common alternating current power source (not shown); while output lines of them are connected to output terminals $U_1$ through $U_{64}$ which are connected to the sequential read circuit 3 which operates in the same manner as in the first and second examples of this invention.

When the magnetic card 31 is inserted in the air gap 37 of the magnetic head 35, the area of the magnetized region 33 is sampled into sixty-four strip-like areas by the first air gaps A of the magnetic head segments $M_1$ through $M_{64}$ and accordingly magnetic fluxes corresponding to the strip-like areas flow in the magnetic head segments $M_1$ through $M_{64}$. The lengths of the strip-like areas apparently represent sequentially sampled amplitudes of the magnetized region and accordingly the waveform to be produced.

Incidentally, the electromotive force (e) of a Hall element is proportional to the product of electric current (i) flowing in the current line of the Hall element and strength (H) of a magnetic field applied to the Hall element ($e \alpha i.H$).

Accordingly, the output lines of the Hall elements $H_1$ through $H_{64}$ produce output voltages corresponding to the strip-like areas described above, or to sixty-four sampled amplitudes of the waveform to be produced.

Thus, if the output voltages from the Hall elements $H_1$ through $H_{64}$ are sequentially read out by the sequential read circuit 3, an output waveform obtained by modulating an alternating current input from the a.c. power source by the waveform stored in the magnetic card 31 is produced at a waveform output terminal P of the sequential read circuit 3. According to an experiment on this, when the a.c. power source had a frequency of 1,000 Hz and a magnetic field strength of the order of 500 Oe was applied to the Hall element $H_1$ through $H_{64}$, an a.c. output having a frequency of 1000 Hz and an amplitude of the order of 30mV was produced.

As is apparent from the above description, the third example of this invention also has the same effects as the first and the second examples of the invention described previously.

The third waveform producing system has been described in connection with the case where a.c. current is supplied to the current lines of the Hall element. However, d.c. current may be supplied to the current lines. In case of supplying a.c. current to the current lines, its amplitude may be varied in synchronization with the operation of the sequential read circuit 3.

The Hall element may be replaced by a well-known magnetic to-electric conversion element such as a magnetic core.

In addition, the third waveform producing system has been described in connection with the case where the magnetized region 33 is formed in the magnetic card 31. However, all that is necessary for the formation of the magnetized region is to render the lateral lengths, or sampled amplitudes, of the magnetized region 3 correspondent to the sampling amplitudes of the waveform to be produced. The invention is not limited to the pattern shown in FIG. 9, but is applicable to other magnetic patterns.

Figure 10:
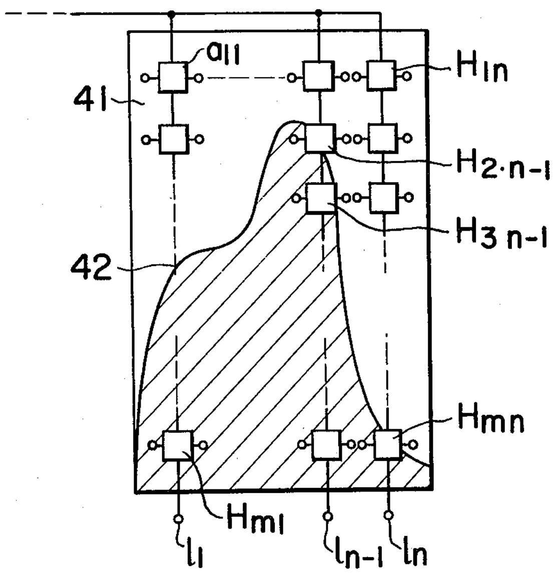
FIG. 10 is a plan view illustrating a part of the magnetic-energy-to-electric-energy conversion section in combination with a magnetic card in a fourth example of the wave form producing system according to this invention.
Figure 11:
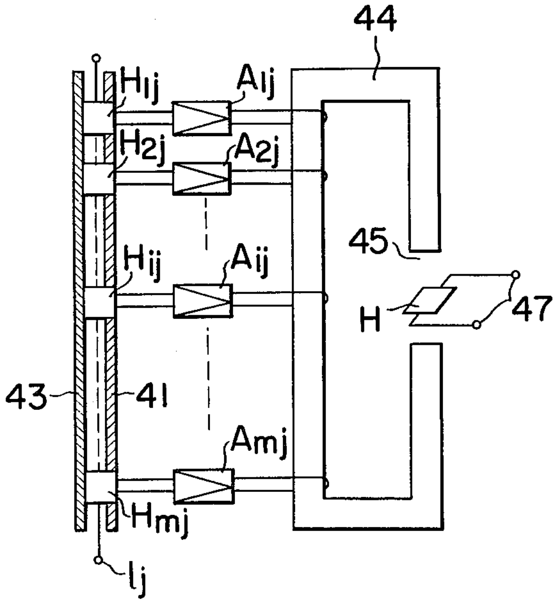
FIG. 11 is an explanatory diagram illustrating essential components of the conversion section partially shown in FIG. 10.

With reference to FIGS. 10 and 11, there is shown a fourth example of the waveform producing system according to this invention which comprises a magnetic-to-electric conversion section.

This magnetic-to-electric conversion section, as is shown in FIG. 10, is provided with a substrate 41 and Hall elements $H_{11}$ through Hmn which are arranged in the form of a matrix having m rows and n columns on the substrate 41. In each of the columns, current lines of the Hall elements are connected in series to one another. The columns of Hall elements thus connected will be referred to as Hall element columns $l_1$ through $l_n$ when applicable. The Hall elements columns $l_1$ through $l_n$ are sequentially energyzed by an external power source (not shown). More specifically, the Hall elements $H_{11}$ through $Hm_1$ on the first column through the Hall elements $H_{1n}$ through $H_{mn}$ on the n-th column are activated column by column by sequentially connecting a wiper, or a sliding contact, of the power source to the Hall element columns $l_1$ through $l_n$.

The fourth waveform producing system further comprises a magnetic pattern forming section which is constituted by a magnetized region, or a magnetic pattern 42, formed on a magnetic record medium 43 such as a magnetic card. When the magnetic pattern forming section is placed in position on the magnetic-to-electric conversion section as shown in FIG. 11, the Hall elements covered bu the magnetic pattern 42 produce electromotive forces.

For convenience and simplification in description, FIG. 11 shows a sectional view of the magnetic-to-electric conversion section taken along the j-th column which is a column of the first through n-th column. In other words, all the sectional views of the magnetic-to-electric conversion section taken along the first through the n-th columns are the same as that shown in FIG. 11. The Hall elements $H_{lj}$ through $H_{mj}$ are provided with amplifiers $A_{lj}$ through $A_{mj}$, respectively, so that output voltages from the Hall elements are converted into output currents.

When the magnetic pattern 42 is placed on the magnetic-to-electric conversion section and the current line $l_j$ is energized, output voltages from the Hall elements which are covered by the magnetic pattern 42 are converted into output currents by the respective amplifiers. An output line of each of the amplifiers is wound on a magnetic circuit 44 comprising a core of, for instance, permalloy, with as many turns as required, for instance one turn, and therefore a magnetic field having strength corresponding to the sum of output currents from the amplifiers are produced in an air gap 45 of the core. In other words, the magnetic circuit 44 receives output currents, from the amplifiers, which are proportional to the number of the Hall elements producing electromotive forces, and magnetically carries out the addition of the output currents thus received.

A Schmitt circuit is a threshold device having two output states i.e. a high level output when the input signal is above an input threshold and a low level output when the input signal is below an input threshold. Thus the slightest variation of the input across the threshold brings forth an extreme variation of the output from the lower level to the higher level, which is defined as a non-linear amplification suitable for quantization of the input signal.

If Schmitt circuits are employed as the amplifiers $A_{lj}$ through $A_{mj}$ so as to produce outputs of "1" when their inputs reach a certain level and to produce outputs of "0" when their inputs are lower than the level, the magnetic pattern 42 can be digitally sampled. More, specifically, if the Hall elements, such as $H_{2.n-1}$, $H_{3.n-1}$ and $H_{mn}$, which are partially covered by the magnetic pattern 42 are rendered to produce the same output at the same level as the Hall elements, such as $H_{ml}$, which are completely covered by the magnetic pattern 42 and if the number of the rows is for instance 128 (m=128) and the number of the columns is, for instance 64 (n=64), the magnetic pattern 42 can be read out as sixty-four sampling signals each having one of the 128 different levels by sequentially energizing the Hall element columns $1_1$ through $1_{64}$ in this case.

In the above description, the magnetic pattern is read out in in an analog mode by obtaining the sums of the electromotive forces of the Hall elements in the Hall element columns.

The magnetic circuit 44 is magnetized by the sum of currents corresponding to the electromotive forces of the Hall elements on each of the column and the magnetic field in the gap 45 becomes proportional to the number of the Hall elements sampled on each of the columns. If a magnetic-to-electric conversion element such as a Hall element H is disposed in this magnetic field and a current is supplied to the Hall element H thus disposed, the Hall element produces an electromotive force in a direction perpendicular to the directions of the magnetic field and the current. As a result n output voltages corresponding to the waveform of the magnetic pattern 42 are produced across the output terminals 47 of the Hall element H by sequentially energizing the Hall element columns $1_1$ through $1_n$.

The fourth waveform producing system employs the amplifiers, however reading the magnetic pattern can be achieved without these amplifiers.

Furthermore, as is apparent from the above description, the outputs from the Hall elements on all of the columns are applied through their amplifiers to one magnetic circuit 44 so that the magnetic pattern is sampled by sequentially energizing the current lines; however if all of the Hall element columns $l_l$ through $l_n$ are provided with their own magnetic circuits 44, respectively and the Hall element columns $l_1$ through $l_n$ are kept connected to the power source, upon placement of the magnetic pattern forming section, or the magnetized region 42, in position on the magnetic-to-electric conversion section the magnetic pattern can be read out in a parallel mode.

Figure 12:
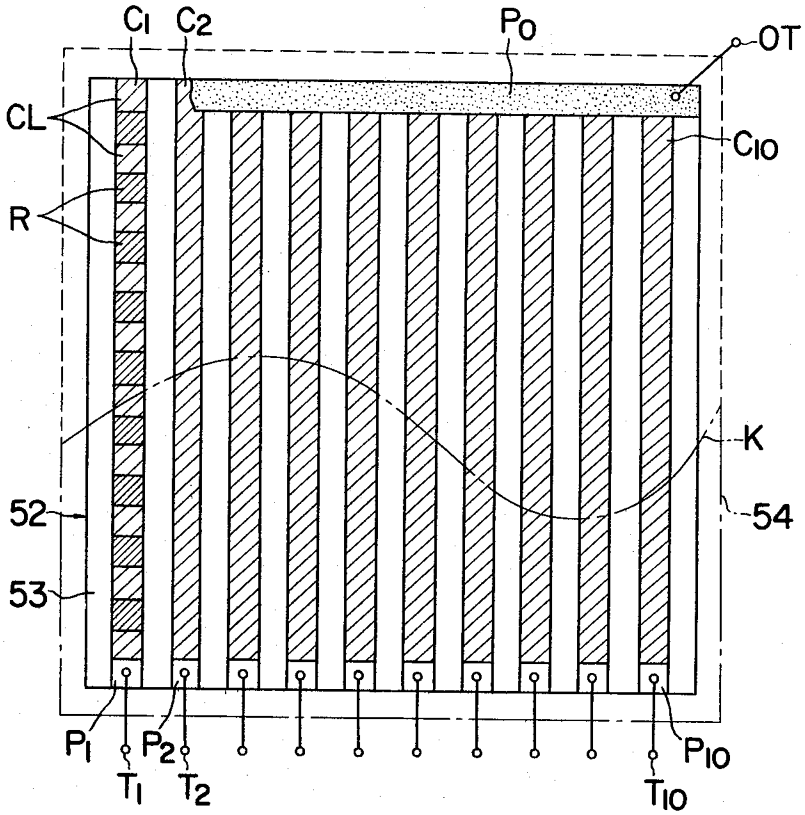
FIG. 12 is an explanatory diagram illustrating a fifth example of the waveform producing system according to this invention.

A fifth example of the waveform producing system of this invention is shown in FIG. 12 which comprises a magnetic-to-electric conversion section 52 and a magnetic pattern forming section 54 formed into one unit with the conversion section 52.

The conversion section 52 is provided with a substrate 53 made of a material such as glass and magnetic-to-electric converter lines $C_1$ through $C_{10}$ disposed in parallel on the substrate 53. Each converter line, as is apparent from the converter line $C_1$ which is representative of the converter lines, comprises a number of magnetoresistive elements R which are vacuum-evaporated films of, for instance, indium antimonide ($I_nS_b$) and a number of connection layers CL made of, for instance, metal which electrically connect between the individual magnetoresistive elements R.

One ends of the converter lines $C_1$ through $C_{10}$ are connected to a common terminal electrode Po provided with an output terminal OT, while the other ends of the converter lines are provided with terminal electrodes $P_1$ through $P_{10}$, respectively, to which terminals $T_1$ through $T_{10}$ are respectively connected.

The magnetic pattern forming section 54 comprises a magnetic shield mask which is formed by vacuum-evaporating a permalloy layer on a "Mylar" type in correspondence to a waveform K to be produced, and a magnetic flux generating source, for instance a ferrite magnet plate which are disposed in place over the magnetic shield mask, similarly as in the second example of this invention. This magnetic pattern forming section 54 may be replaced by a magnetic tape or a magnetic card which magnetically forms the waveform to be reproduced.

It is not always necessary to form the magnetic flux generating source into one unit with the waveform producing system.

The waveform K is magnetically projected on the substrate 53, and accordingly converter lines $C_1$ through $C_{10}$ by the magnetic pattern forming section 54.

In each of the converter lines, a number of magnetic elements R are connected in series so as to provide a relatively greater resistance variation ratio, but they may be replaced one line of magneto-resistive material. The magnetoresistive material may be gallium arsenide (Ga As) or gallium phosphide (Ga P) of silicon (Si) instead of indium antimonide (In Sb).

If the waveform producing system thus organized is combined with the read circuit of an electronic musical instrument, the waveform to be produced can be read out.

Figure 13:
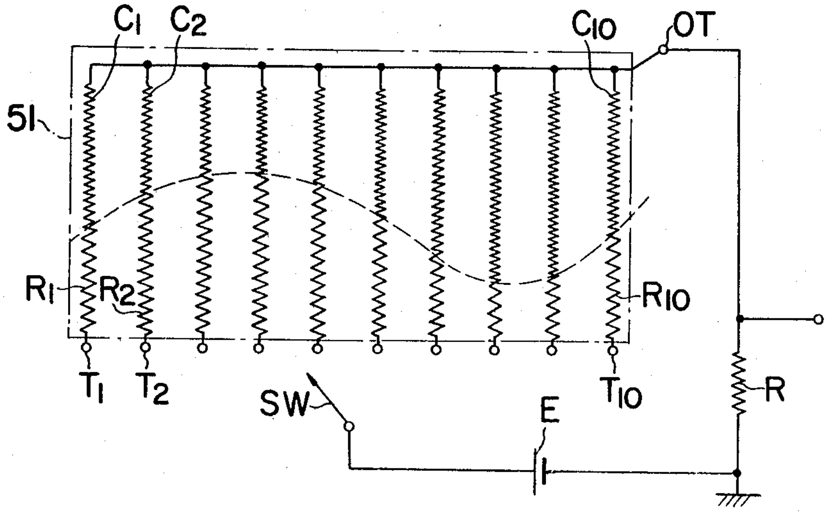
FIG. 13 is an equivalent circuit diagram of the fifth example including a sequential read circuit.

Shown in FIG. 13 is a schematic circuit diagram illustrating an equivalent circuit of the fourth waveform producing system shown in FIG. 12 and its read circuit. Since resistance of a magneto-resistive element R made of InSb is increased by the application of a magnetic field, the magnetoresistive elements $R_1$–$R_{10}$ (in the upper portion of a block 51) which are applied with a magnetic field increase their resistance, while the resistances of the magneto-resistive elements (in the lower part of the block 51) which are not applied with the magnetic field or which are applied with a magnetic field weakened by the magnetic shield mask are lower than those of the magnetoresistive elements in the upper portion.

The output terminal OT is connected through a load resistance R to the negative electrode of a power source E, and sequentially switching means SW is connected to the positive electrode of the same. This switching means is adapted to connect the positive electrode of the power source to the terminals $T_1$ through $T_{10}$ one by one, that is, the converter lines $C_1$ through $C_{10}$ are sequentially energized. As a result, the converter lines $C_1$ through $C_{10}$ sequentially produce outputs which represent sequentially sampled amplitudes of the waveform by the operation of the switching means SW, and the outputs thus produced are applied across the load resistance R. Various conventional switching means can be employed as the sequentially switching means H.

It is obvious to those skilled in the art that various changes and modification can be made in the magnetic-to-electric conversion section 52. For instance, FIG. 12, the object of this conversion section 52 can be achieved by a magnetic-to-electric conversion section in which magnetic-to-electric converters which are in the form of potentiometers each obtained by arranging a magnetoresistive member between a resistive member and a conductive member disposed in parallel to the resistive member are arranged in parallel, along the time axis of the waveform, on the substrate. Furthermore, the object of the magnetic-to-electric conversion section 52 can be also achieved by the provision of a magnetic-to-electric conversion section which comprises an elongated resistive member provided with a number of first conductive members connected to taps, second conductor members which are the same in number as those of the first conductive members and intersected with the first conductive members, and magnetoresistive materials disposed at the intersections, different tap voltages from the resistive member being obtained by controlling the application of a magnetic field to the intersections and accordingly to the magnetoresistive elements.

As is apparent from the above description, the fourth waveform producing system has a simple construction and a semi-permanent service life, and is suitable for the production of waveforms such as tone-coloring waveforms or envelope waveforms of electronic musical instruments.

While all of the examples of this invention have been described in connection with the production of waveforms employed in electronic musical instruments, it is particularly understood that the invention is not limited thereto or thereby.

I claim:

1. A waveform producing system which comprises:

a pattern forming section comprising a source of infrared radiation, and means for spatially distributing the infrared radiation for forming a spatial pattern of infrared radiation in the shape of a waveform to be produced; a conversion section comprising means for converting said pattern of infrared radiation into electrical outputs which represent time-sequentially sampled amplitudes of the waveform; and a sequential read circuit for sequentially reading out the electrical outputs to produce the waveform; in which said pattern forming section is a thermal pattern forming section comprised of said source of infrared radiation and an infrared radiation shielding plate constituted by an infrared radiation absorbing region and an infrared radiation passing region shaped to form a thermal pattern corresponding to said waveform by shielding a part of the infrared radiation emitted from said source of infrared radiation, and said conversion section comprises a plurality of parallel lines of first transducers for converting thermal-energy to electric-energy, each of the transducers constituting a magnetic flux generating source defining a magnetic circuit, an infrared radiation receiving piece within the magnetic circuit and heated by the received infrared radiation and made of a magnetic material whose permeability abruptly changes when the temperature thereof exceeds a certain value thereby affecting magnetic flux generated from the magnetic flux generating source, and a second transducer within the magnetic circuit for converting magnetic-energy to electric-energy and producing an electrical output controlled by magnetic flux applied thereto, said parallel lines of transducers converting infrared radiation which is applied thereto as the thermal pattern into electrical outputs corresponding to sequentially sampled amplitudes of the thermal pattern and accordingly the waveform to be produced and is to be read out by said sequential read circuit.

2. A waveform producing system as claimed in claim 1 in which said second transducers are Hall elements having current lines and output lines, and including means connecting said output lines in series to one another to form said parallel lines of first transducers connected to said sequential read circuit, means connecting said current lines in series, and a constant current source energizing said current lines.

3. A waveform producing system as claimed in claim 1 in which said first transducer comprises said heat-receiving piece and a magnetic core provided with a primary winding as a magnetic flux generating source and a secondary winding as in element for converting magnetic-energy to electric-energy.

4. A waveform producing system as claimed in claim 1 in which said thermal pattern forming section source comprises means for effecting a planar temperature distribution corresponding to said waveform to be produced.

5. A waveform producing system as claimed in claim 1 in which said thermal pattern forming means radiation shielding plate comprises a thermal conductor provided with an embossed pattern corresponding to said waveform to be produced.

6. A waveform producing system which comprises:

a pattern forming section comprising a magnetic flux generating source, and means for spatially distributing the magnetic field for forming a magnetic flux spatial pattern in the shape of a waveform to be produced; a conversion section comprising means for converting said magnetic flux pattern into electrical outputs which represent time-sequentially sampled amplitudes of the waveform; and a sequential read circuit for sequentially reading out the electrical outputs to produce the waveform; in which said pattern forming section comprises said magnetic flux generating source and a magnetic flux shielding plate constituted by a magnetic flux shielding region and a magnetic flux passing region shaped to form a magnetic pattern corresponding said waveform by shielding a part of the magnetic flux generated by the magnetic flux generating source, and said conversion section comprises a plurality of parallel lines of transducers for converting magnetic-energy to electrical energy, which operate to convert magnetic flux applied thereto as said magnetic flux pattern form said pattern forming section into electrical outputs which represent sequentially sampled amplitudes of said magnetic pattern and accordingly said waveform to be produced and which are time-sequentially read out by said sequential read circuit.

7. A waveform producing system as claimed in claim 6 in which said transducers are Hall elements having current lines and output lines, and including means connecting said output lines in series in said parallel lines of transducers to form one output line connected to said sequential read circuit, said current line being connected in series, and a constant current source energizing said current line.

8. A waveform producing system as claimed in claim 6 in which said magnetic pattern forming section comprises a magnetic plate having a non-magnetized portion and a magnetized portion formed in a pattern corresponding to said waveform to be produced.

9. A waveform producing system as claimed in claim 6 in which said magnetic pattern forming section comprises a magnetization sheet or card having a magnetic pattern which is formed by magnetizing a portion of said sheet or card in correspondence to said waveform to be produced.

10. A waveform producing system which comprises:

a pattern forming section comprising a magnetic flux generating source, and means for spatially distributing the magnetic field for forming a magnetic flux spatial pattern in the shape of a waveform to be produced; a conversion section comprising means for converting said magnetic flux pattern into electrical outputs which represent time-sequentially sampled amplitudes of the waveform; and a sequential read circuit for sequentially reading out the electrical outputs to produce the waveform; in which said pattern forming section comprises a magnetic card having a magnetized region defining a magnetic pattern corresponding to said waveform to be produced, and said conversion section comprises a magnetic head constituted by magnetic head segments each having means defining a first air gap and means defining a second air gap, said first air gaps defining a magnetic card insertion air gap for accommodating said magnetic card, and transducers for converting magnetic-energy to electric-energy which are disposed in said second air gap of the respective magnetic head segments, said magnetic card being inserted in said magnetic card insertion air gap so as to produce electrical outputs which represent time-sequentially sampled amplitudes of said magnetic pattern and accordingly said waveform to be produced and which are time-sequentially read out by said sequential read circuit.

11. A waveform producing system as claimed in claim 10 in which said transducers are Hall elements having current lines and output lines, and including means connecting said current lines in series, a common power source energizing said current lines, means connecting said output lines to said sequential read lines for having said electrical outputs from said Hall elements time-sequentially read out by said sequential read circuit.

12. A waveform producing system which comprises:

a pattern forming section comprising a magnetic flux generating source, and means for spatially distributing the magnetic field for forming a magnetic flux spatial pattern in the shape of a waveform to be produced; a conversion section comprising means for converting said magnetic flux pattern into electrical outputs which represent time-sequentially sampled amplitudes of the waveform; and a sequential read circuit for sequentially reading out the electrical outputs to produce the waveform; in which said pattern forming section comprises a magnetic record medium having a magnetized region defining a magnetic pattern corresponding to said waveform to be produced, and said conversion section comprises parallel lines of first transducers for converting magnetic-energy to electric-energy which convert magnetic flux applied thereto as said magnetic flux pattern into electric outputs, a magnetic circuit having means magnetized for causing said electrical outputs from said transducers to be magnetically added separately in each of said parallel lines thereby to produce a magnetic field, and a second transducer for converting the strength of said magnetic fields produced by said magnetic circuit into electrical signals, which represent time-sequentially sampled amplitudes of said magnetic pattern and accordingly said waveform to be produced.

13. A waveform producing system as claimed in claim 12 in which said conversion section further comprises amplifiers, for converting voltage to current, provided for respective ones of said first transducers, to convert said electric outputs from the first transducers into electric currents applied to said magnetic circuit to develop said magnetic field.

14. A waveform producing system as claimed in claim 13 in which said first transducers are Hall elements with current lines which are connected in series to form said parallel lines of transducers and having output lines connected to said amplifiers.

15. A waveform producing system as claimed in claim 12 in which said magnetic circuit is provided for each of said parallel lines of transducers to simultaneously obtain said output signals in a parallel mode.

16. A waveform producing system which comprises:

a pattern forming section comprising a magnetic flux generating source, and means for spatially distributing the magnetic field for forming a magnetic flux spatial pattern in the shape of a waveform to be produced; a conversion section comprising means for converting said magnetic flux pattern into electrical outputs which represent time-sequentially sampled amplitudes of the waveform; and a sequential read circuit for sequentially reading out the electrical outputs to produce the waveform; in which said conversion section comprises a magnetic-energy to electric-energy conversion section which comprises a substrate disposed in place on said magnetic pattern forming section and lines of magnetic-energy to electric-energy converters arranged on said substrate at intervals along the time axis of the waveform represented by said magnetic flux pattern, each of said converters comprising a plurality of magnetoresistive elements, said lines of magnetic-energy to electric-energy converters receiving magnetic flux as said magnetic flux pattern thereby producing electrical outputs which represent time-sequentially sampled amplitudes of said magnetic pattern and accordingly the waveform to be produced, said electrical output being time-sequentially read out by said sequential read circuit, said magnetic pattern forming section and said conversion section being formed into one unit.

* * * * *